Sept. 27, 1966 C. E. ATKINS 3,275,897
TOUCH CONTROL CIRCUIT
Original Filed May 3, 1963
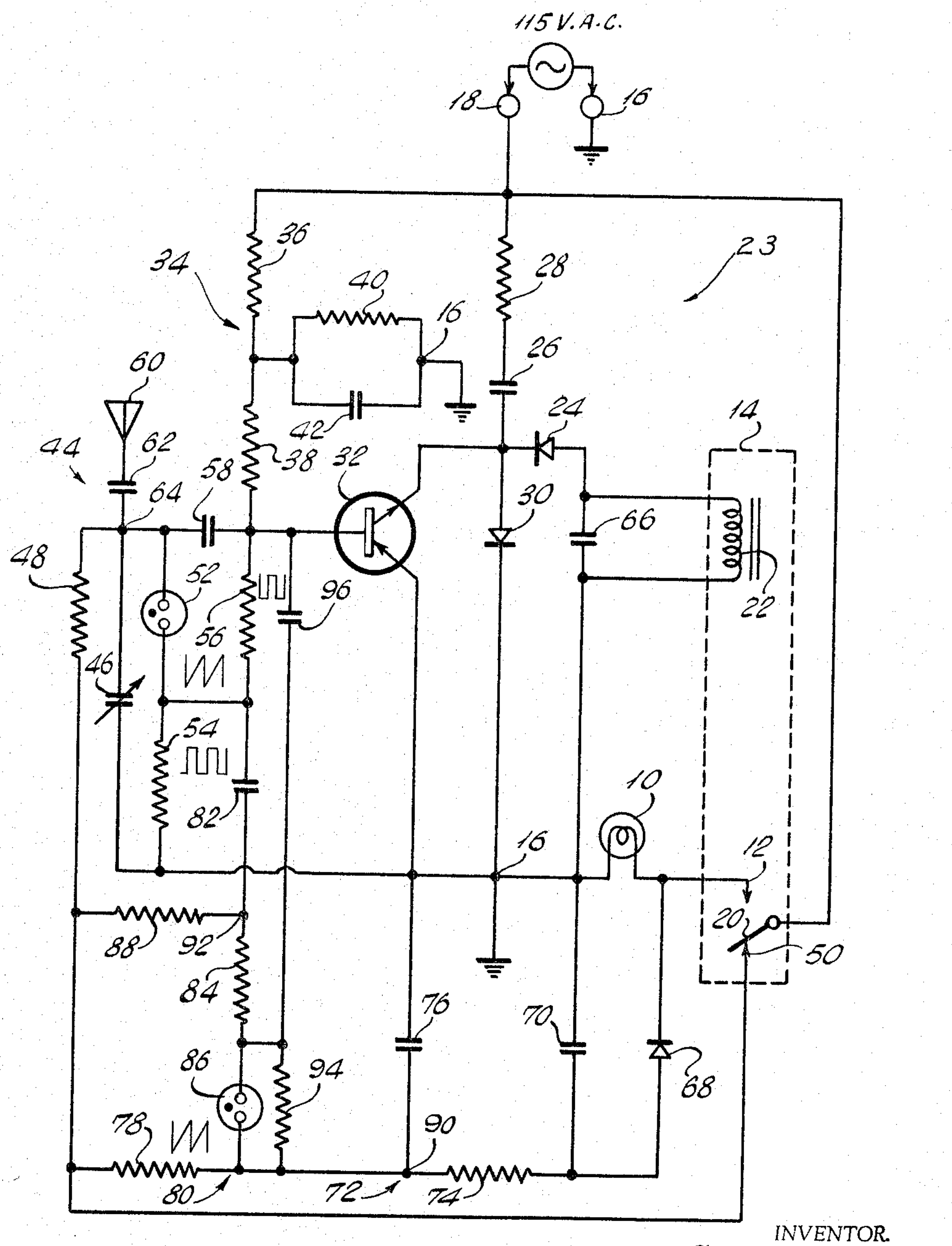
INVENTOR.
CARL E. ATKINS
BY Eyre, Mann & Lucas
ATTORNEYS United States Patent Office
3,275,897
Patented Sept. 27, 1966

3,275,897
TOUCH CONTROL CIRCUIT

Carl E. Atkins, Montclair, N.J., assignor to Tung-Sol Electric Inc., a corporation of Delaware Continuation of application Ser. No. 277,888, May 3, 1963. This application June 22, 1965, Ser. No. 469,050
4 Claims. (Cl. 317—146)

This application is a continuation of application Ser. No. 277,888, filed May 3, 1963, now abandoned.

The present invention relates to control circuits and provides a circuit which responds to body capacity either to make or break a circuit connection upon contact with a single touch responsive surface.

In my co-pending application, Ser. No. 222,045, filed September 7, 1962, I disclose touch responsive control circuits which employ a semiconductor diode and switching device, preferably a four zone PNPN germanium device such as a 2N1966 to control the current flow through the coil of a relay. In these circuits the diode and switching device are each connected in shunt across the coil of the relay and in series with a ballast circuit across an A.C. source of excitation. The diode is connected to short the coil of the relay during the half cycles of one polarity of current from the source and the switching device is connected so that it can either be made conductive to short the coil or nonconductive to permit current flow through the coil during the half cycles of current of the opposite polarity. Therefore, with the semiconductor device conductive, the relay is unenergized and, with the semiconductor device nonconductive, the relay is energized.

In accordance with my present invention, a circuit is provided which requires only a single touch responsive element in connection therewith to render the semiconductor switching device either conductive or nonconductive. This circuit, which constitutes the preferred embodiment of my invention, may be best understood by reference to the accompanying figure which is an electrical schematic thereof.

In the preferred embodiment, a load 10 is connected between a normally open terminal 12 of a relay 14 and the grounded terminal 16 of a two-terminal 115 v. 60 cycle source of excitation. The other terminal 18 of the source of excitation is connected to the armature 20 of the relay to permit current flow through the load 10 to be controlled by energization and deenergization of the relay.

The coil 22 of the relay is connected, in a series circuit 23, with a diode 24, a ballast and phase shifting capacitor 26, and a ballast resistor 28 across the excitation terminals 16 and 18, and a second diode 30 and a PNPN germanium semiconductor device 32, such as a 2N1966, are each shunted across the first diode 24 and the coil 22. The shunting diode 30 conducts during the positive one-half cycle of the current drawn by the series circuit 23 from the excitation to short the coil 22 during those one-half cycles and thereby allow the energization and deenergization of the coil to be controlled by the semiconductor device 32 which can be selectively rendered conductive or nonconductive during the negative one-half cycles of current drawn by the series circuit 23.

A biasing network 34 connects the base of the semiconductor device to the ungrounded terminal 18 of the source of excitation. The biasing network 34 includes two resistors 36 and 38 connected in series between the ungrounded excitation terminal 18 and the base of the semiconductor switching device 32 and also includes a resistor 40 and capacitor 42 connected in parallel between the junction of the two resistors 36 and 38 and the grounded excitation terminal 16. The voltage supplied across the base and emitter of the switching device 32 by the network 34 leads the line voltage but lags the voltage applied across the collector and emitter of the switching device. At the start of the negative half cycle of the voltage wave at the collector of the switching device, the base is thus biased positive with respect to the emitter by the network 34 and switching device would be rendered nonconductive at this time in the absence of superimposed negative voltage at the base.

Added to the voltage supplied at the base of the semiconductor switching device by network 34 is the output of an oscillaor 44. The oscillator is described and claimed in co-pending applicaiton Ser. No. 388,644, filed August 10, 1964. This oscillator has a capacitor 46 and a resistor 48 connected in series with the armature 20 and normally closed contact 50 of the relay across the excitation terminals 16 and 18. When the excitation is originally applied across terminals 16 and 18, the armature 20 is positioned against the normally closed contact 50 allowing current to flow from the source of excitation through the resistor 48 to charge capacitor 46. Connected in series across the charging capacitor 46 is a glow discharge tube 52 and a discharge resistor 54. When the charge on capacitor 46 exceeds the breakdown potential of the glow discharge tube, the glow discharge tube conducts, discharging the capacitor until the voltage across the capacitor becomes insufficient to maintain conduction in the glow discharge tube. Then the glow discharge tube 52 extinguishes and the capacitor 46 again starts charging towards the glow tube breakdown potential. Breakdown potential of the glow tube is only reached near the peak of the voltage wave. The peak of the positive half cycle of the voltage applied to capacitor 46 occurs when the potential at the collector of the semiconductor switching device starts its negative half cycle.

At this time the alternate charging and discharging of capacitor 46 produces a series of positive sawtooth voltage waves across the glow tube 52 and the discharging of capacitor 46 produces a series of positive voltage pulses accross resistor 54. The sawtooth waves are differentiated by an RC circuit, consisting of a resistor 56 and a capacitor 58 connected in series across glow discharge tube 52, to produce a series of negative pulses across resistor 56. Resistors 54 and 56 are connected in series between the base and emitter of the semiconductor switching device 32 to sum the positive pulses across resistor 54 with the negative pulses across resistor 56. This summation provides a single series of resultant pulses whose magnitude is equal to the difference between the magnitudes of the positive and negative pulses across resistors 54 and 56 respectively. These resultant pulses are sufficiently negative to drive the base negative with respect to the emitter during the negative half cycles of current drawn by the series circuit 23 and thereby make semiconductor device 32 conductive. The above described sawtooth waves across tube 52, positive pulses across resistor 54 and negative pulses across reistor 56 occurring when the poitive half cycle of the voltage wave from the source has just passed its peak are shown diagrammatically in the drawing. As pointed out previously, diode 30 conducts during the positive one-half cycle of current drawn by the series circuit 23. Therefore the relay is initially deenergized.

For energization of the relay 14, a touch responsive element 60 is electrically connected to a terminal which is connected by a capacitor 62 to the junction 64 of capacitor 46 and resistor 48. When this touch responsive element 60 is contacted, the body capacity of the individual touching the element increases the capacity between the junction 64 and ground. This increases the amount of charge necessary to bring the potential between point 64 and ground to the breakdown potential of the glow tube 52 and therefore increases the magnitude of the positive pulses produced across resistor 54 when the capacitor 46 is discharged through the glow discharge tube. The increase in the magnitude of the positive pulses across resistor 54 decreases the negative potential of the resultant pulses to render semiconductor 32 non-conducting, thereby permitting current to flow through the coil 22 of the relay during the negative one-half cycles of the current drawn from the line through series circuit 23.

While current is passing through the coil 22 on the negative half cycle, a capacitor 66 connected across the coil charges. During the positive half cycle when diode 30 is conducting, diode 24 prevents the passage of current from the capacitor 66 to ground through the diode 30. Capacitor 66 therefore discharges through the coil 22 to keep the relay energized until the next negative half cycle.

With energization of the relay, the armature 20 of the relay moves from the normally closed contact 50 to the normally open contact 12 completing the circuit between the load 10 and the source of excitation. Energization of the relay also opens the charging path of the oscillator capacitor 46 momentarily incapacitating the oscillator 44 to prevent it from returning the semiconductor device to a conductive state once touch is removed from the touch responsive element 60.

A diode 68 and a capacitor 70 are connected in series across the load 10 to provide a D.C. power supply. With the relay energized and current flowing through the load 10, the D.C. power supply produces a negative potential across capacitor 70 which is used to charge capacitor 46 through resistors 48, 74 and 78 when the relay is energized. This means that with the relay 14 energized capacitor 46 is charged negatively irrespective of the polarity of the current drawn through the series circuit 23. Therefore, during the negative half cycles of current so drawn, the pulses produced across resistor 56 are positive and the pulses produced across resistor 54 are negative reversing the situation occurring when the relay 22 is deenergized. This makes the resulting pulses positive or insufficiently negative to render the semiconductive switching device conductive. This also reverses the effect which contacting the touch responsive element has on the magnitude of the resultant pulses and therefore the resultant pulses become sufficiently negative when the touch responsive element is contacted to render the semiconductor switching device conductive.

Thus, with the relay energized, the resulting pulses are not sufficiently negative to render the semiconductor switching device conductive during the negative half cycles of the potential wave at the collector of device 32 and contacting the touch responsive element results in making the resulting pulses sufficiently negative to trigger the semiconductor swinging device conductive during such negative half cycles. This is the opposite situation from that occurring when the relay is deenergized where the pulses are sufficiently negative to render the semiconductor switching device conductive during the negative half cycles and contacting the touch responsive element makes the pulses less negative to prevent them from rendering the semiconductor device conductive.

It should be apparent that, if this reversal in the pulses across resistors 54 and 56 occurred while the touch responsive element 60 was still contacted, the relay would immediately be deenergized. To prevent this, a lag circuit 72 consisting of a resistor 74 and a capacitor 76 is provided in the charging path to delay the initial charging of the capacitor 46 by the negative D.C. voltage from capacitor 70. This delay allows sufficient time for the person touching the touch responsive element 60 to remove his hand after energization of the relay before deenergization of the relay by the pulses from the oscillator 44 can occur. As explained above, after the touch has been removed from the touch responsive element, the pulses will not be sufficiently negative to make the semiconductor 32 conductive and therefore the relay will remain in its energized state until the touch responsive element 60 is again touched.

When the touch responsive element 60 is touched after the effective period of the delay provided by the lag circuit 72 the semiconductor 32 of course conducts. This deenergizes the relay and returns the armature 20 of the relay to the normally closed contact 50 of the relay. With the armature returned to the normally closed contact 50, the capacitor 46 is charged to a positive potential during the first part of the negative one-half cycles of current drawn by the series circuit 23 to produce positive pulses across resistor 54 and negative pulses across resistor 56.

As pointed out above, with the relay deenergized the pulses resulting from the summation of the negative pulses across resistor 56 and the positive pulses across resistor 54 will not be sufficiently negative to keep the semiconductor switching device conductive so long as the touch responsive element 60 is contacted. Therefore, the semiconductor switching device would lapse back into nonconductivity and permit reenergization of the relay 14 unless a further signal is provided to keep the semiconductor switching device conducting until touch is removed from the touch responsive element. For this purpose, a transition oscillator 80 is provided which supplies a series of overwhelmingly negative pulses to the base of the semiconductor switching device 32 to bias the base of the semiconductor device 32 conductive for a period which is sufficient to allow removal of touch from the touch responsive element. This oscillator consists of a capacitor 82, a resistor 84, and a glow tube 86 connected in series between the point of common connection of resistors 54 and 56 and the lag circuit 72, and a resistor 88 which connects the capacitor 82 to the normally closed terminal 50 of the relay 14.

In the interval occurring immediately after deenergization of the relay, capacitor 76 remains charged, providing a negative potential at point 90, and capacitor 82 is charged to a positive potential through resistor 88 during the negative half cycles of current drawn by the series circuit 23, providing positive potential with respect to ground potential at point 92. The difference between the potentials at points 90 and 92 exceeds the breakdown potential of the glow discharge tube 86 rendering it conductive, to provide a discharge path for the charge on capacitor 82. The capacitor therefore discharges dropping the potential at point 92. Discharge continues until the current through the glow discharge tube 86 falls below the sustaining level. With this the glow discharge tube is extinguished and capacitor 82 again starts charging towards the breakdown potential of the glow discharge tube. Therefore, there is an alternate charging and discharging of the capacitor 82, producing a series of positive sawtooth shaped voltage waves across the glow tube 86. These sawtooth waves are shown diagrammatically in the drawing.

The transistion oscillator 80 is connected to the base of the semiconductor switching device 32 by a resistor 94 connected across the glow discharge tube 86 and capacitor 96 connected between the tube 86 and the base to supply excitation from the transition oscillator 80 to the base. This excitation is the sawtooth waves produced across glow discharge tube 86 which have been differentiated by a differentiating circuit, consisting of the capacitor 96 and resistors 56 and 54. This provides a series of pulses between the base and the collector of the semiconductor switching device 32 which are negative with respect to ground potential. These negative pulses render the semiconductor switching device 32 conductive during the negative half cycles of current drawn by the series circuit 23 and therefore keep the relay deenergized. Eventually, however, capacitor 76 is discharged sufficiently to drop the maximum possible difference in potential between points 90 and 92 below the breakdown potential of the glow discharge device 86, deactivating the transistion oscillator 80. However, by this time contact with the touch responsive element 60 should have ended and the pulses from the main oscillator 44 will be sufficient to render the semiconductor switching device 32 conductive thereby keeping the relay deenergized.

My invention has now been described in connection with one embodiment thereof employing some of the circuitry disclosed in my above mentioned co-pending application. While I find this particular embodiment preferable because among other things its operational costs are low, it will be understood that various changes could be made in the specific circuit illustrated without departing from the spirit of the invention or the scope of the accompanying claims.

I claim:

1. In a touch responsive circuit of the type having a switching circuit which in response to controlling signals energizes a relay to position the armature of the relay in a first position and deenergizes the relay to position the armature of the relay in a second position, the improvement comprising:

(a) an electric signal means including an oscillator coulped to the switching circuit providing a series of first signals to the switching circuit when the armature is in the first position to keep the relay energized and providing a series of second signals to the switching circuit when the armature is in the second position to keep the relay deenergized;

(b) a touch responsive means coupled to the oscillator of the electric signal means which while touched when the relay is in the first position and controlled by the series of first signals will deenergize the relay and which while touched when the relay is in the second position and controlled by the series of second signals will energize the relay;

(c) means coupled to the switching circuit and operative when the relay armature is in the first position for keeping the relay armature in the first position for a period after the relay armature is initially positioned in the first position irrespective of whether the touch responsive means is touched or not; and (d) means coupled to the switching circuit and including a transition oscillator for keeping the relay in the second position for a period after the relay armature is initially positioned in the second position, irrespective of whether the touch responsive means is touched or not.

2. A touch responsive circuit comprising:

(a) a relay having an energized and deenergized state;

(b) a switching circuit coupled to said relay to deenergize the relay and keep the relay deenergized when supplied with pulses whose potential is within a range and otherwise will energize the relay;

(c) an oscillator coupled to said switching circuit to provide two trains of simultaneous pulses of opposite polarity, sums the two trains of simultaneous pulses of opposite polarity to produce a train of resultant pulses and supplies the resultant pulses to the switching circuit;

(d) means coupled to said oscillator to reverse the polarities of the two trains of simultaneous pulses each time the relay changes state so that the potential of resultant pulses is inside the range when the relay is deenergized and outside the range when the relay is energized;

(e) touch responsive means coupled to said oscillator so that when it is contacted it changes the magnitude of one of the two trains of simultaneous pulses so that the potential of the resultant pulses is within the range when the relay is deenergized and is outside the range when the relay is energized;

(f) means coupled to said oscillator to keep the pulses supplied to the switching circuit outside the range for a period after the relay is initially energized by the touch responsive means irrespective of whether the touch responsive element is contacted or not; and (g) means coupled to said switching circuit to provide pulses inside the range for a period after the relay is initially deenergized by contacting the touch responsive means irrespective of whether the touch responsive element is contacted or not.

3. The circuit of claim 2 wherein said means to keep the pulses supplied to the switching circuit outside the range is a delay means which suppresses the production of pulses by the oscillation circuit for the period after the relay is initially energized.

4. The circuit of claim 2 wherein said means to provide pulses in the range is a transition oscillator which supplies pulses inside the range to the switching circuit for the period after the relay is initially deenergized.

References Cited by the Examiner

UNITED STATES PATENTS

| | | | |
|---|---|---|---|
| 2,743,433 | 4/1956 | Parmet. | |
| 2,992,420 | 7/1961 | Riker. | |
| 3,025,434 | 3/1962 | Atkins et al. | 312—146 |
| 3,081,594 | 3/1963 | Atkins et al. | 317—149 X |
| 3,109,893 | 11/1963 | Burns. | |
| 3,111,608 | 11/1963 | Boenning et al. | |
| 3,200,304 | 8/1965 | Atkins et al. | 317—146 |
| 3,200,306 | 8/1965 | Atkins et al. | 317—146 |

MAX L. LEVY, *Primary Examiner.*

SAMUEL BERNSTEIN, *Examiner.*

L. T. HIX, *Asistant Examiner.*